United States Patent
Francois et al.

(10) Patent No.: US 10,666,938 B2
(45) Date of Patent: *May 26, 2020

(54) DERIVING REFERENCE MODE VALUES AND ENCODING AND DECODING INFORMATION REPRESENTING PREDICTION MODES

(71) Applicant: CANON KABUSHIKI KAISHA, Tokyo (JP)

(72) Inventors: Edouard Francois, Bourg des Comptes (FR); Guillaume Laroche, Saint Aubin d'Aubigne (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/296,079

(22) Filed: Mar. 7, 2019

(65) Prior Publication Data

US 2019/0208194 A1 Jul. 4, 2019

Related U.S. Application Data

(63) Continuation of application No. 15/891,763, filed on Feb. 8, 2018, now Pat. No. 10,264,253, which is a
(Continued)

(30) Foreign Application Priority Data

Sep. 12, 2011 (GB) .................................. 1115739.3

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11);
(Continued)

(58) Field of Classification Search
None
See application file for complete search history.

(56) References Cited

U.S. PATENT DOCUMENTS

| | | | |
|---|---|---|---|
| 2005/0157784 A1* | 7/2005 | Tanizawa | H04N 19/105 375/240.03 |
| 2009/0087110 A1* | 4/2009 | Tourapis | H04N 19/176 382/238 |
| 2011/0243226 A1* | 10/2011 | Choi | H04N 19/61 375/240.12 |

FOREIGN PATENT DOCUMENTS

| | | |
|---|---|---|
| EP | 2719180 A1 | 4/2014 |
| JP | 2007243391 A | 9/2007 |

(Continued)

OTHER PUBLICATIONS

Wei-Jung Chien, web, http://phenix.int-evry.fr/jct/doc_end_user/documents/6_Torino/wg11/JCTVC-F459-v4.zip, JCTVC-F459, working draft, Accessed Oct. 21, 2015, 9 pages.
(Continued)

*Primary Examiner* — Eileen M Adams
(74) *Attorney, Agent, or Firm* — Canon U.S.A., Inc. IP Division

(57) ABSTRACT

Reference prediction mode values, also referred to as most probable modes, usable for encoding or decoding of a prediction mode related to a current coding unit, are derived. First and second reference prediction mode values are derived (S402) from respective prediction modes of at least two neighbouring coding units of the current coding unit. The first and second reference prediction modes are different. A third reference prediction mode value is derived
(Continued)

(S403) from the first and second reference prediction mode values. The third reference prediction mode is different from each of said first and second reference prediction mode values.

By deriving three MPMs instead of two for comparison with the prediction mode of the current coding block the coding efficiency is improved. This is due to the increase in the probability that the prediction mode of the current coding block corresponds to one of the derived most probable modes.

16 Claims, 10 Drawing Sheets

Related U.S. Application Data continuation of application No. 14/344,315, filed as application No. PCT/EP2012/003829 on Sep. 12, 2012, now Pat. No. 9,930,332.

(51) Int. Cl.
*H04N 19/176* (2014.01)
*H04N 19/46* (2014.01)
*H04N 19/196* (2014.01)
*H04N 19/593* (2014.01)
*H04N 19/463* (2014.01)
*H04N 19/52* (2014.01)

(52) U.S. Cl.
CPC .......... *H04N 19/196* (2014.11); *H04N 19/46* (2014.11); *H04N 19/463* (2014.11); *H04N 19/52* (2014.11); *H04N 19/593* (2014.11)

(56) References Cited

FOREIGN PATENT DOCUMENTS

| JP | 2019-126086 A | 7/2019 |
|---|---|---|
| JP | 2019-146216 A | 8/2019 |

OTHER PUBLICATIONS

Tzu-Der Chuang, et al., Luma Intra Prediction Mode Coding, Joint Collaborative Team on Video Coding (JCT-VC) of ITU-T SG16 WP3 and ISO/IEC JTC1/SC29/WG11, 6th Meeting, Jul. 14-22, 2011, pp. 1-5, Doc. No. JCTVC-F062, Date Saved Jul. 15, 2011.

Wei-Jung Chien, et al., Parsing friendly intra mode coding, Joint Collaborative Team on Video Coding (JCT-VC) of ITU-T SG16 WP3 and ISO/IEC JTC1/SC29/WG11, 6th Meeting, Jul. 14-22, 2011, pp. 1-5, Doc. No. JCTVC-F459.

* cited by examiner

DERIVING REFERENCE MODE VALUES AND ENCODING AND DECODING INFORMATION REPRESENTING PREDICTION MODES

CROSS-REFERENCE TO RELATED APPLICATIONS

This application is a continuation Ser. No. 15/891,763, filed on Feb. 8, 2018 that is a Continuation of U.S. patent application Ser. No. 14/344,315, filed on Sep. 11, 2014, that is the National Phase application of PCT Application No. PCT/EP2012/003829, filed on Sep. 12, 2012 and titled "Deriving reference mode values and encoding and decoding information representing prediction modes". This application claims the benefit under 35 U.S.C. § 119(a)-(d) of United Kingdom Patent Application No. 1115739.3, filed on Sep. 12, 2011 and titled "Method and device for encoding or decoding information representing prediction modes". The above cited patent applications are hereby incorporated by reference herein in their entireties.

FIELD OF THE INVENTION

The invention relates to a method and a device for encoding or decoding mode values representing prediction modes. Particularly, but not exclusively the invention relates more specifically to intra mode coding in the High Efficiency Video Coding (HEVC) standard under development.

DESCRIPTION OF THE PRIOR ART

Video applications are continuously moving towards higher resolution. A large quantity of video material is already distributed in digital form over broadcast channels, digital networks and packaged media, with a continuous evolution towards higher quality and resolution (e.g. higher number of pixels per frame, higher frame rate, higher bit-depth or extended color gamut). This technology evolution brings higher pressure on the distribution networks that are already facing difficulties to carry HDTV resolution and data rates economically to the end user. Therefore, any further data rate increase will put additional pressure on the networks. To handle this challenge, ITU-T and ISO/MPEG decided to launch in January 2010 a new video coding standard project, named High Efficiency Video Coding (HEVC).

The HEVC codec design is similar to that of most previous so-called block-based hybrid transform codecs such as H.263, H.264, MPEG-1, MPEG-2, MPEG-4, SVC. Video compression algorithms such as those standardized by the standardization bodies ITU, ISO and SMPTE use the spatial and temporal redundancies of the images in order to generate data bit streams of reduced size compared with these video sequences. Such compressions make the transmission and/or storage of the video sequences more effective.

During video compression in the proposed HEVC encoder, each block of an image being processed is predicted spatially by an "Intra" predictor (so-called "Intra" coding mode), or temporally by an "Inter" predictor (so-called "Inter" coding mode). Each predictor is a block of pixels issued from the same image or another image, from which a difference block (or "residual") is derived. In the Intra coding mode the predictor (Intra predictor) used for the current block is a block of pixels constructed from the information already encoded of the current image. By virtue of the identification of the predictor block and the coding of the residual, it is possible to reduce the quantity of information actually to be encoded.

The encoded frames are of two types: temporal predicted frames (either predicted from one reference frame called P-frames or predicted from two reference frames called B-frames) and non-temporal predicted frames (called Intra frames or I-frames). In I-frames, only Intra prediction is considered for coding blocks. In P-frames and B-frames, Intra and Inter prediction are considered for coding blocks.

If "Intra" coding is selected, an item of information for describing the "Intra" predictor used is coded before being inserted in the bit stream to be sent to a corresponding decoder.

In the current HEVC design, as well as in previous designs such as MPEG-4 AVC/H.264, intra coding involves deriving an intra prediction block from reconstructed neighboring samples 101 of the block to be encoded (decoded), as illustrated schematically in FIGS. 1A and 1B Multiple prediction modes are supported, either directional or non-directional. In HEVC the number of supported modes depends on the size of a coding unit (CU). As at the filing date of the present application the HEVC specification is still subject to change but presently the following supported modes are contemplated: 4 modes for 64×64 CU, 18 modes for 4×4 CU, 35 modes for CU of other sizes (8×8 to 32×32).

When a CU is intra coded, its related intra prediction mode has to be coded. Referring to FIG. 1B, when coding a current CU 102, Intra mode coding makes use of two neighbouring CUs that have already been coded, namely the Top and Left CUs 103 and 104.

FIG. 2 illustrates intra prediction modes considered in HEVC. The intra prediction modes include a planar prediction mode identified by a mode prediction value 0, a DC mode having a mode prediction value 3 and a number of directional prediction modes identified by mode prediction values 4 to 34 for predicting directional structures in an image corresponding to different angles. Also included are horizontal prediction mode 2 and vertical prediction mode 1.

FIG. 3 is a flowchart for use in explaining how Intra mode coding is performed in the current HEVC design. In a first step S201 the Intra prediction modes of the neighboring Top and Left CUs 103 and 104, as illustrated in FIG. 1B, are identified. The two CUs may share the same Intra prediction mode or may have different Intra prediction modes. Accordingly, in step S201 one or two different intra prediction modes can be identified. In step S202, two 'Most Probable Modes' (MPMs), are derived from the identified intra prediction modes. If the prediction modes of the Top and Left CUs 103 and 104 are different, then two MPMs, MPM0 and MPM1, are set to respectively the minimum and maximum value of the Top and Left CU prediction modes. If the prediction modes from the Top and Left CUs 103 and 104 are equal, and if they do not correspond to the Planar prediction mode, then MPM0 is set equal to Planar mode and MPM1 is set to the prediction mode of the Top or Left CUs prediction mode. If the prediction modes of the Top and Left CUs 103 and 104 both correspond to the Planar mode, then MPM0 is set equal to the Planar mode and MPM1 is set to the DC mode. MPM0 and MPM1 are thus ordered according to their prediction mode values, the prediction mode having the smaller mode value being referred to as MPM0 and the prediction mode having the greater mode value being referred to as MPM1. In step S203 the prediction mode of the current coding unit is then compared to the two MPMs. If the prediction mode of the current coding unit is equal to either MPM0 or MPM1 then in step S204 a first coding process (process 1) is applied.

This first coding process involves coding a flag signaling that the mode of the current block is equal to one of the MPMs, and then, coding the index of the MPM concerned (0 if MPM0, 1 if MPM1).

If in step S203 it is determined that the prediction mode of the current block is not equal to one of the two MPMs, then in step S205 a second coding process (process 2) is applied.

Unlike the first coding process, the second coding process involves coding the mode value of the current block.

Statistically process 1 is more often used than process 2. Statistically, a prediction mode is more often equal to one of its MPMs than different from all of the MPMs. The entropy coding engine benefits from this property, either by using shorter codewords in process 1 than in process 2, or by exploiting the higher probability of being equal to one of the MPMs (arithmetic coding as used in CABAC efficiently exploits the probability to improve the encoding and reduce the coding cost). The present invention has been devised to address one or more of the foregoing concerns and desires. It is desirable to improve the coding efficiency of methods for encoding prediction mode information.

According to a first aspect of the invention there is provided a method of encoding mode information representing a prediction mode related to a current coding unit by an intra mode coding process, a method of encoding a mode value representing a prediction mode related to a current coding unit to be encoded, the method comprising: deriving first and second reference prediction mode values from respective prediction modes of at least two neighbouring coding units of the current coding unit, the first and second reference prediction modes being different from one another; and comparing the prediction mode value to be encoded with one or more of the reference prediction mode values; and selecting, based on the comparison, an encoding process, from among at least first and second encoding processes, to apply to the mode value to be encoded; wherein, the method further comprises deriving a third reference prediction mode value from the first and second reference prediction mode values, the third reference prediction mode being different from each of said first and second reference prediction mode values; and said comparison comprises comparing the prediction mode value to be encoded with at least one of the first, second and third reference prediction mode values.

By deriving three MPMs instead of two for comparison with the prediction mode of the current coding block the coding efficiency is improved. This is due to the increase in the probability that the prediction mode of the current coding block corresponds to one of the derived most probable modes. Since this enables a more economical encoding process to be used to encode the prediction mode of the current coding block, the overall coding cost is reduced.

According to a second aspect of the invention there is provided a device for encoding mode information representing a prediction mode related to a current coding unit, the device comprising: derivation means for deriving first and second reference prediction mode values from respective prediction modes of at least two neighbouring coding units of the current coding unit, the first and second reference prediction modes being different from one another; and comparison means for comparing the prediction mode value to be encoded with one or more of the reference prediction mode values; and selection means for selecting, based on the comparison, an encoding process, from among at least first and second encoding processes, to apply to the mode value to be encoded; wherein, the derivation means is operable to derive a third reference prediction mode value from the first and second reference prediction mode values, the third reference prediction mode being different from each of said first and second reference prediction mode values; and said comparison means is operable to compare the prediction mode value to be encoded with at least one of the first, second and third reference prediction mode values.

According to a third aspect of the invention there is provided a method of decoding a mode value representing a prediction mode related to a current decoding unit to be decoded, the method comprising: deriving first and second reference prediction mode values from respective prediction modes of at least two neighbouring decoding units of the current decoding unit, the first and second reference prediction modes being different from one another; and comparing the prediction mode value to be decoded with one or more of the reference prediction mode values; and selecting, based on the comparison, a decoding process, from among at least first and second decoding processes, to apply to the mode value to be decoded; wherein, the method further comprises deriving a third reference prediction mode value from the first and second reference prediction mode values, the third reference prediction mode being different from each of said first and second reference prediction mode values; and said comparison comprises comparing the prediction mode value to be decoded with at least one of the first, second and third reference prediction mode values.

According to a fourth aspect of the invention there is provided a device for decoding a mode value representing a prediction mode related to a current decoding unit to be decoded, the device comprising: derivation means for deriving first and second reference prediction mode values from respective prediction modes of at least two neighbouring decoding units of the current decoding unit, the first and second reference prediction modes being different from one another; and comparison means for comparing the prediction mode value to be encoded with one or more of the reference prediction mode values; and selection means for selecting, based on the comparison, a decoding process, from among at least first and second decoding processes, to apply to the mode value to be decoded; wherein, the derivation means is operable to derive a third reference prediction mode value from the first and second reference prediction mode values, the third reference prediction mode being different from each of said first and second reference prediction mode values; and said comparison means is operable to compare the prediction mode value to be decoded with at least one of the first, second and third reference prediction mode values.

According to a further aspect of the invention there is provided a method of deriving reference prediction mode values for encoding or decoding of a prediction mode related to a current coding unit, the method comprising: deriving first and second reference prediction mode values from respective prediction modes of at least two neighbouring coding units of the current coding unit, the first and second reference prediction modes being different from one another; and deriving a third reference prediction mode value from the first and second reference prediction mode values, the third reference prediction mode being different from each of said first and second reference prediction mode values; wherein the first, second and third reference prediction mode values are usable for comparison with the prediction mode value to be encoded or decoded.

In an embodiment, the third reference prediction mode value is set to a mode value corresponding to a planar prediction mode if none of said first and second reference prediction mode values corresponds to the planar prediction mode.

In an embodiment, if one of the first and second reference prediction mode values corresponds to a DC prediction mode and the other of the first and second reference prediction mode values corresponds to a planar prediction mode, the further prediction mode value is set to a predefined prediction mode value.

In an embodiment, the predefined prediction mode value is signalled in a slice or picture header.

In an embodiment, the predefined prediction mode value has a small prediction mode value, such as for example a prediction mode value less than 5.

In an embodiment, the predefined prediction mode value corresponds to a horizontal prediction mode or a vertical prediction mode.

In an embodiment, the predefined prediction mode value is dependent upon the content of the image being encoded.

In an embodiment, the predefined prediction mode value is adaptively derived based on mode probabilities representative of the probability of occurrence of respective prediction modes, said mode probabilities being regularly computed.

In an embodiment, if one of the first and second reference prediction mode values corresponds to a directional prediction mode and the other of the first and second reference prediction mode values corresponds to a planar prediction mode, the third prediction mode value is set at a prediction mode value corresponding to the prediction mode with the next angular direction superior to the direction of the reference prediction mode value concerned.

In an embodiment, the at least two neighbouring encoding or decoding units comprise the left neighbouring encoding unit or decoding and the top neighbouring encoding or decoding unit of the current encoding or decoding unit.

In an embodiment, the first encoding or decoding process comprises encoding or decoding first information indicating a predetermined relationship between the mode value to be encoded or decoded and at least one of the first, second and third reference prediction mode values, and the second encoding or decoding process comprises encoding or decoding second information representing the mode value to be encoded or decoded.

In an embodiment, the first encoding or decoding process is selected when the mode value to be encoded or decoded is equal to at least one of the three reference prediction mode values, and the second encoding or decoding process is selected when the mode value to be encoded or decoded differs from each of the three reference prediction mode values.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Embodiments of the invention will now be described, by way of example only, and with reference to the following drawings in which:—

FIGS. 1A and 1B, discussed hereinbefore, are schematic diagrams for use in explaining how an intra prediction block is derived in the current HEVC design;

FIG. 2, also discussed hereinbefore, schematically illustrates intra prediction modes in the current HEVC design, FIG. 3, also discussed hereinbefore, is a flowchart for use in explaining intra mode coding in the current HEVC design;

DETAILED DESCRIPTION OF THE EMBODIMENTS

Figure 4:
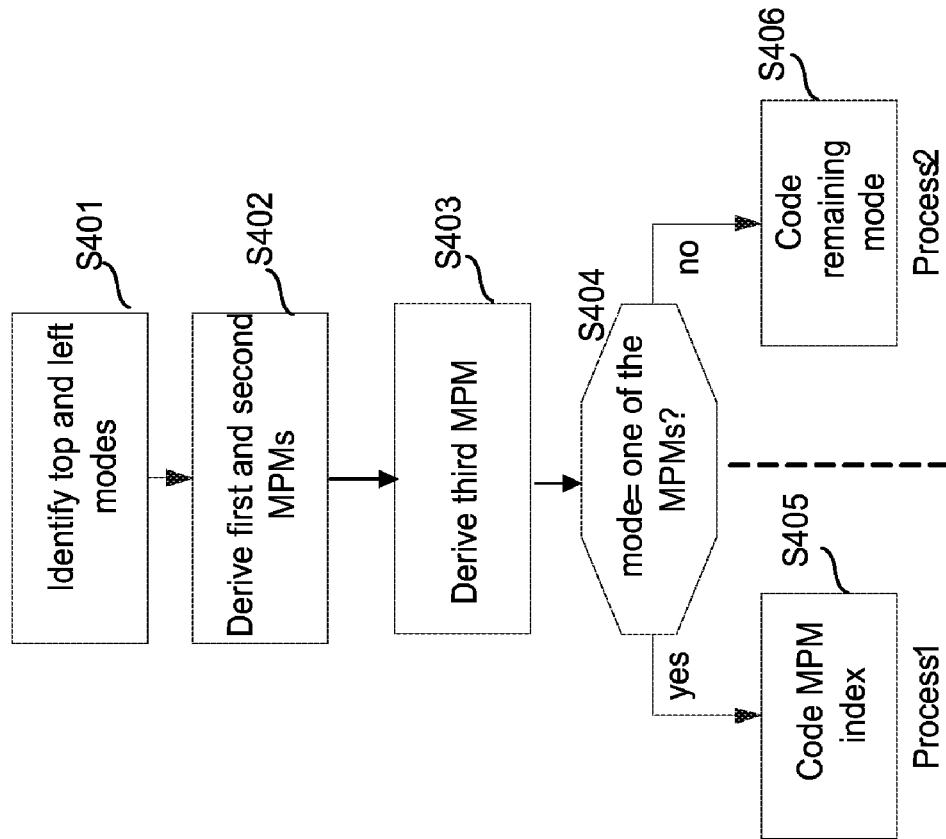
FIG. 4 is a flowchart for use in explaining a principle of intra mode coding according to at least one embodiment of the present invention.

FIG. 4 is a flowchart for use in explaining a principle of an intra mode coding method embodying the present invention. The intra mode coding method according to this flowchart is applicable to any entropy coding engines such as CABAC or CAVLC.

Figure 3:
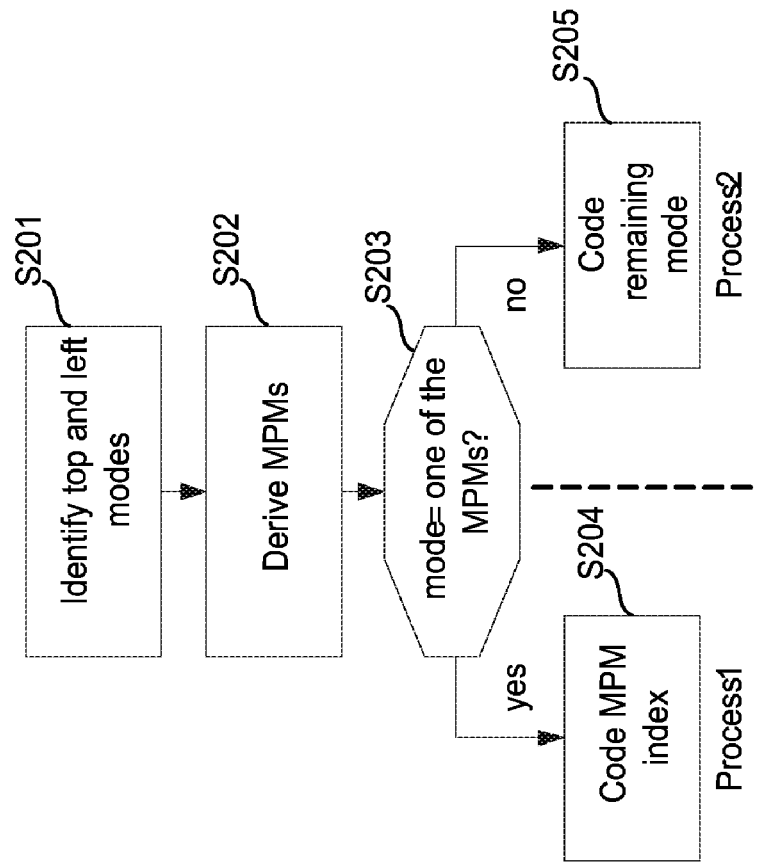

In FIG. 4, steps S401 and S402 are the same as steps S201 and S202, respectively, in FIG. 3, and the description of these steps is not repeated here.

In step S403 a third most probable mode (MPM2) is derived from the first and second most probable modes MPM0 and MPM1 derived from the prediction modes of the neighbouring top and left CUs in step S402.

Figure 5:
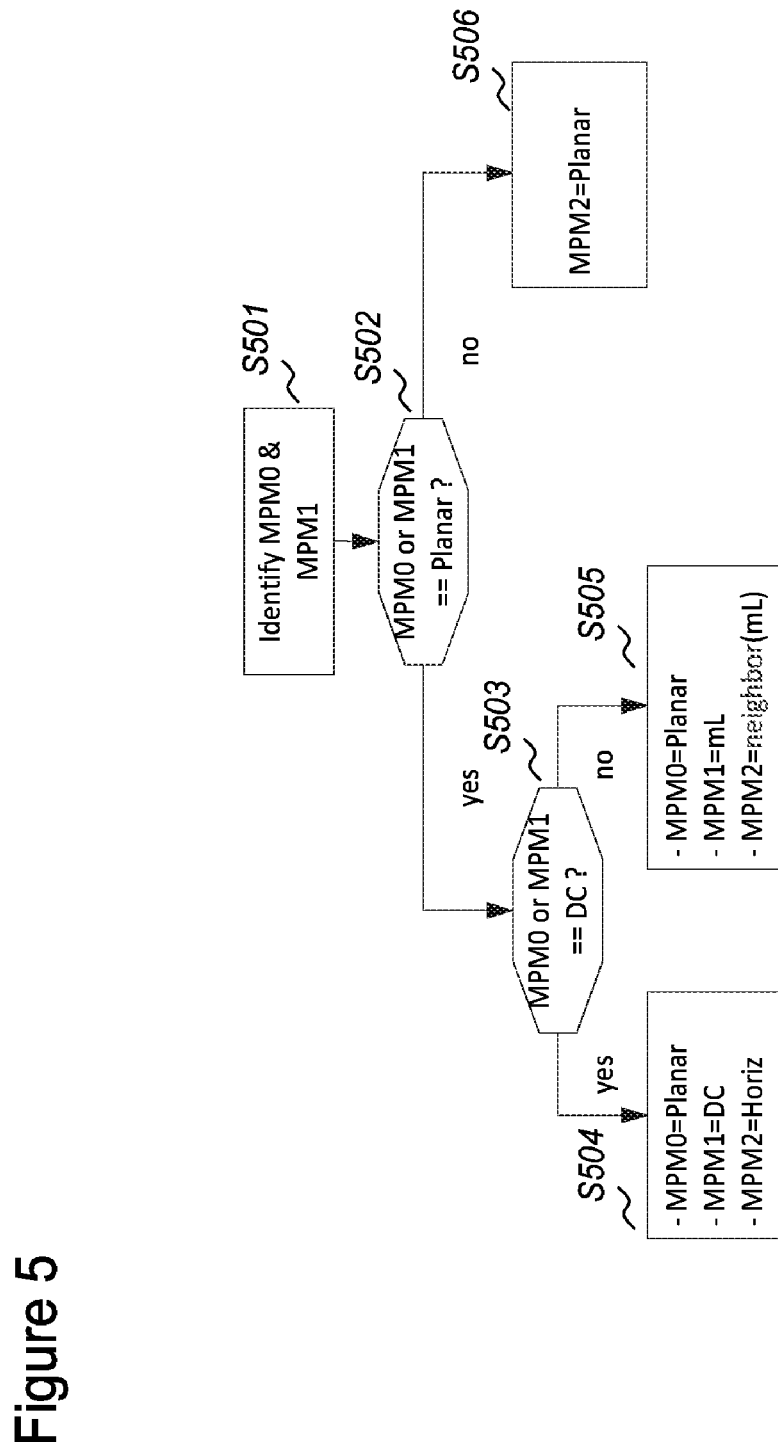
FIG. 5 is a flowchart of steps of a method for deriving a reference prediction mode value according to an embodiment of the present invention.

FIG. 5 is a flow chart illustrating in more detail the steps for deriving the third most probable mode MPM2 according to a first embodiment of the invention. In step S501 first and second most probable modes values MPM0 and MPM1 as derived in step S402 are identified. In step S502 it is checked as to whether one of the most probable mode values MPM0 and MPM1 corresponds to a planar prediction mode. This step may involve checking both most probable mode values to check if they correspond to a planar prediction mode. In an alternative embodiment of the invention when the most probable mode values MPM0 and MPM1 have been ordered according to their prediction mode values it may only be necessary to check if MPM0 corresponds to a planar mode since MPM0 will correspond to the lower order prediction mode. If neither MPM0 nor MPM1 correspond to a planar prediction mode, the further most probable mode MPM2 is set at a mode value corresponding to a planar prediction mode in step S506. Since a planar mode is statistically the most frequently used prediction mode, it is beneficial to insert it into the set of MPMs for the later comparison step, since it is a more likely to correspond to the prediction mode of the current block.

If, however, it is determined in step S502 that either one of the first and second MPMs, MPM0 or MPM1, corresponds to a planar mode, it is then checked in step S503 if the other MPM0 or MPM1 corresponds to a DC prediction mode. If it is determined that one of the first and second MPMs MPM0 or MPM1 corresponds to a planar prediction mode and the other of the first and second MPMs MPM0 and MPM1 corresponds to a DC prediction mode, the third MPM MPM2 is set at a pre-defined mode value.

Practically, prediction modes with a small prediction mode value are used because they are more likely to correspond to the prediction mode of the current block. In the example illustrated in FIG. 5, MPM2 is set at a prediction mode value 2 corresponding to the vertical prediction mode.

It may be noted that a prediction mode value 2, corresponding to horizontal direction prediction could also be chosen, but the vertical direction is statistically more present in natural images than horizontal structures and so is more likely to correspond to the prediction mode of the current block.

In some embodiments of the invention the pre-defined prediction mode may be signaled in the slice or picture header, since it may be dependent on the picture content, for instance depending on the statistics of the modes distribution in the image.

In another embodiment of the invention the pre-defined prediction mode can be adaptively derived, based on mode probabilities representative of the probability of occurrence of respective prediction modes that are regularly computed In this case, probability tables are defined. Each time a mode is coded, its probability is updated. When MPM0 and MPM1 are Planar and DC, MPM2 is computed as the mode different from Planar and DC which has the highest probability value. Therefore the MPM2 is, in this specific case of Planar and DC as the two first MPMs, adaptively computed depending on the image content.

Figure 6:
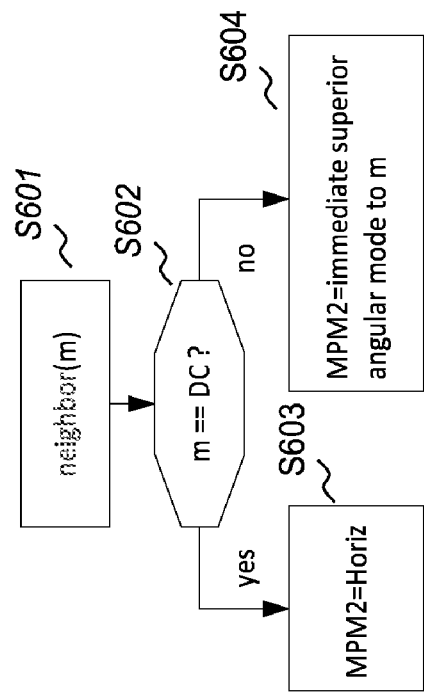
FIG. 6 is a flowchart illustrating steps related to the method of FIG. 5.

If, however it is determined in step S503 that neither of the first MPM MPM0 and the second MPM MPM1 correspond to a DC prediction mode and that thus one of the first and second MPMs, MPM0 or MPM1 corresponds to a directional prediction mode MPM_dir, the third MPM MPM2 is set to the directional prediction mode with the nearest authorized superior angular direction to the direction of MPM_dir in step S505. With reference to FIG. 6 which illustrates this process in more detail. In step S601 the prediction mode of the neighbouring coding units which is not a planar mode is identified. In step S602 it is determined if the identified prediction mode is DC. If yes MPM2 is set at a vertical prediction mode, otherwise if the identified prediction mode is not a DC MPM2 is set at the nearest authorized superior angular direction to the direction (MPM_dir) of mode m in step S604.

Figure 1B:
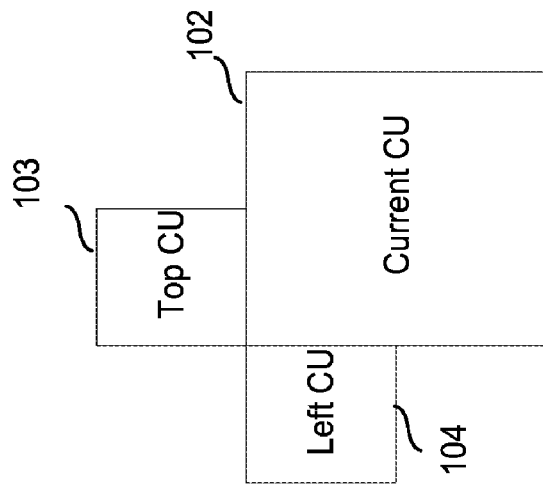
Figure 1A:
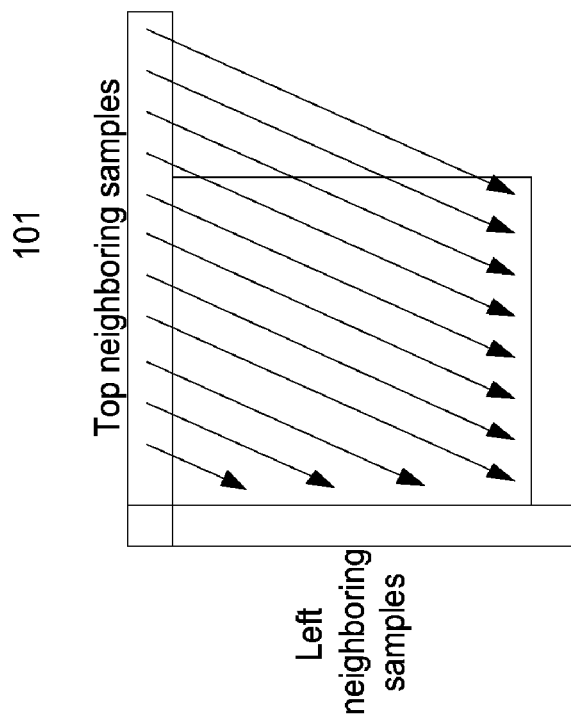
Figure 2:
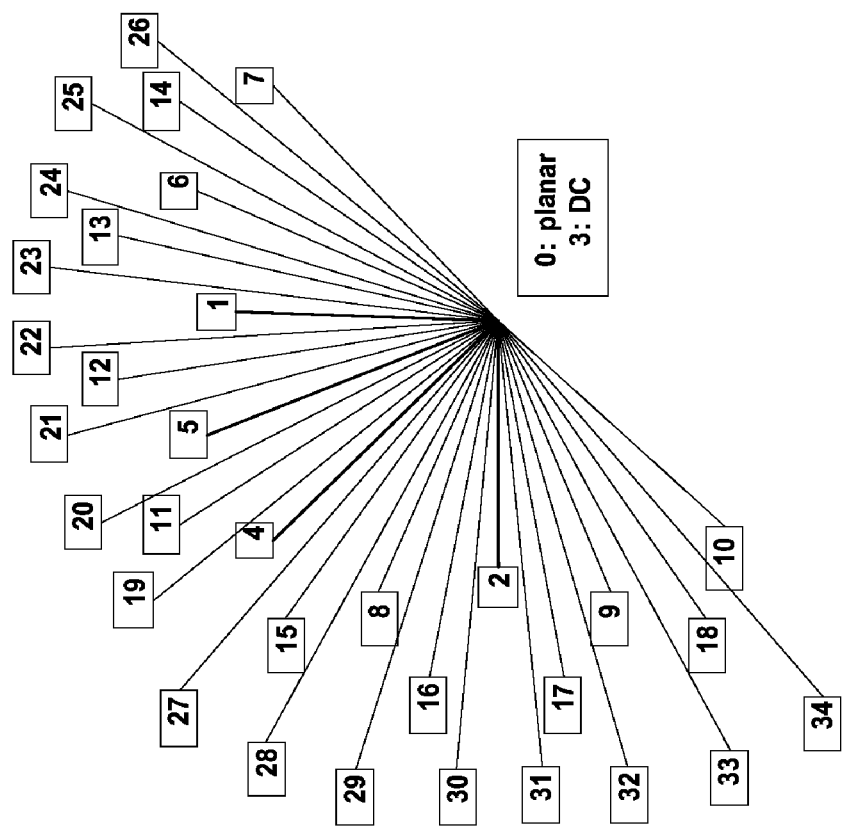

For example, if MPM_dir is equal to 13, with reference to FIG. 2, MPM2 is set to 24 if the current coding unit is of size 8×8 to 32×32, or 6 if the current coding unit is of size 4×4 (in the current HEVC design, in 4×4 CU, modes with value higher to 17 are forbidden). Using the nearest superior angular direction has been experimentally shown to be the most performing solution.

It will be appreciated that in some embodiments of the invention the order of most probable prediction modes MPM0 and MPM1 may be ordered according to their prediction values before the third most probable prediction mode MPM2 is derived. In alternative embodiments of the invention step S402 may no include the process of reordering MPM0 and MPM1 according to their prediction mode value, and then MPM0, MPM1 and MPM2 may be ordered according to their prediction mode value after MPM2 has been derived.

Returning to FIG. 4 it is verified in step S404 if the prediction mode related to the current coding block is equal to the first MPM MPM0, the second MPM MPM1 or the third MPM MPM2 derived in steps S402 and S403 in order to determine whether encoding Process 1 or encoding Process 2 will be applied to encode the prediction mode value of the current coding block. Process 1, which is carried out when the mode of the current block is equal to one of the three MPMs MPM0, MPM1 or MPM2, is implemented in step S405. In some embodiments of the present invention step S405 can be the same as step S204 in FIG. 3 and will not be described in detail here.

Process 2, which is carried out when the mode of the current block is different from each of the first MPM MPM0, the second MPM MPM1, and the third MPM, MPM2 is implemented in step S406. Step S406 is the same as the corresponding step S205 in FIG. 3, and will not be described in detail here.

Using three MPMs instead of two for comparing with the prediction mode of the current coding block improves the coding efficiency since the probability that the prediction mode of the current coding block corresponds to one of the derived most probable modes is increased. This in turn increases the likelihood that the more economical encoding process 1, which requires less bits to signal the prediction mode of the current coding block, will be used to encode the prediction mode of the current coding block. Consequently the overall coding cost is reduced. At the same time the complexity of the overall process is not over-increased by deriving a large number of MPMs.

Figure 7:
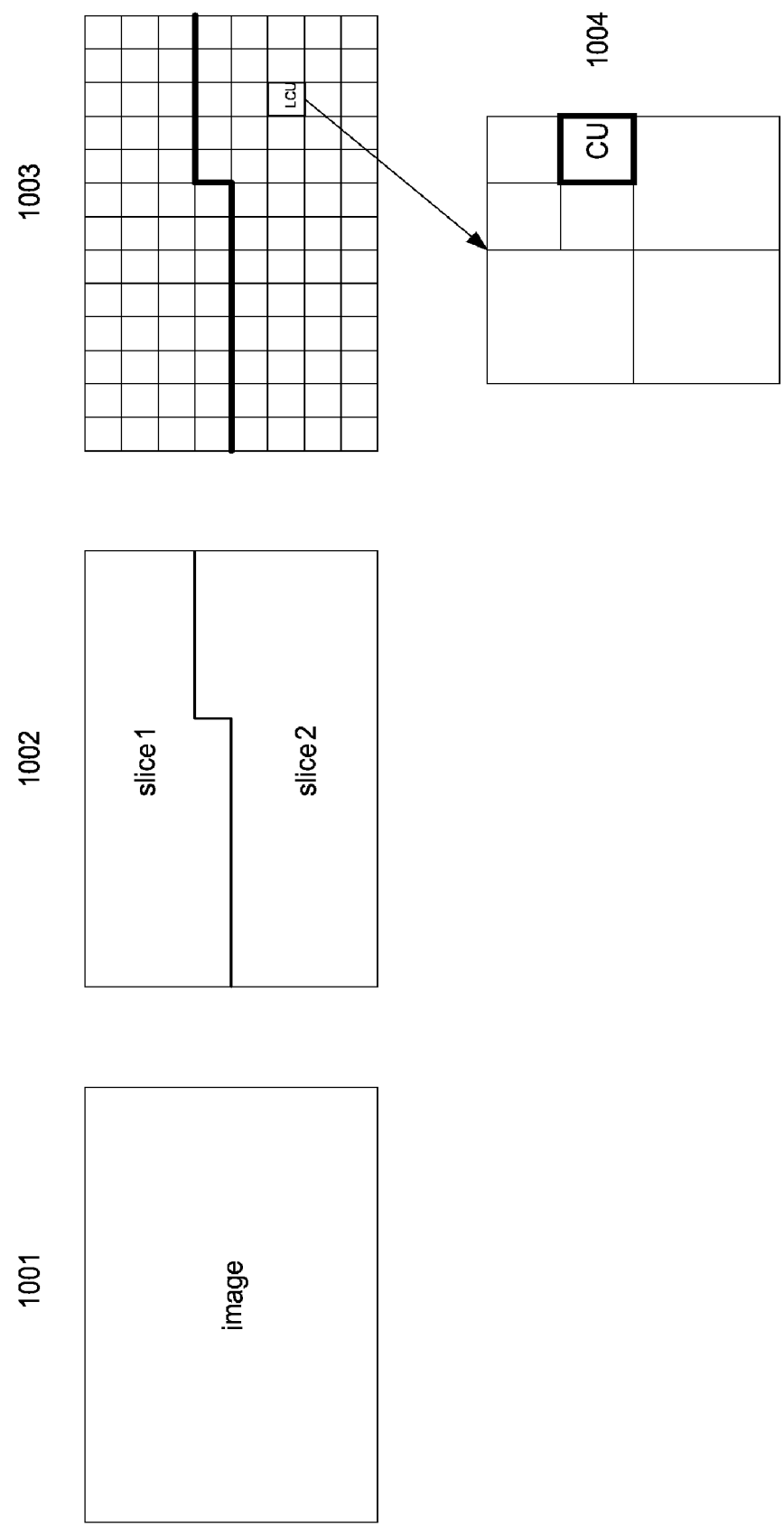
FIG. 7 shows a sequence of images.

FIG. 7 shows the image coding structure 100 used in HEVC. According to HEVC and one of its previous predecessors, the original video sequence 1001 is a succession of digital images "images i". As is known per se, a digital image is represented by one or more matrices the coefficients of which represent pixels.

The images 1002 are divided into slices 1003. A slice is a part of the image or the entire image. In HEVC these slices are divided into non-overlapping Largest Coding Units (LCUs) 1004, generally blocks of size 64 pixels×64 pixels. Each LCU may in its turn be iteratively divided into smaller variable size Coding Units (CUs) 1005 using a quadtree decomposition. Each CU can be further partitioned into a maximum of 2 symmetric rectangular Partition Units 1006.

Figure 8:
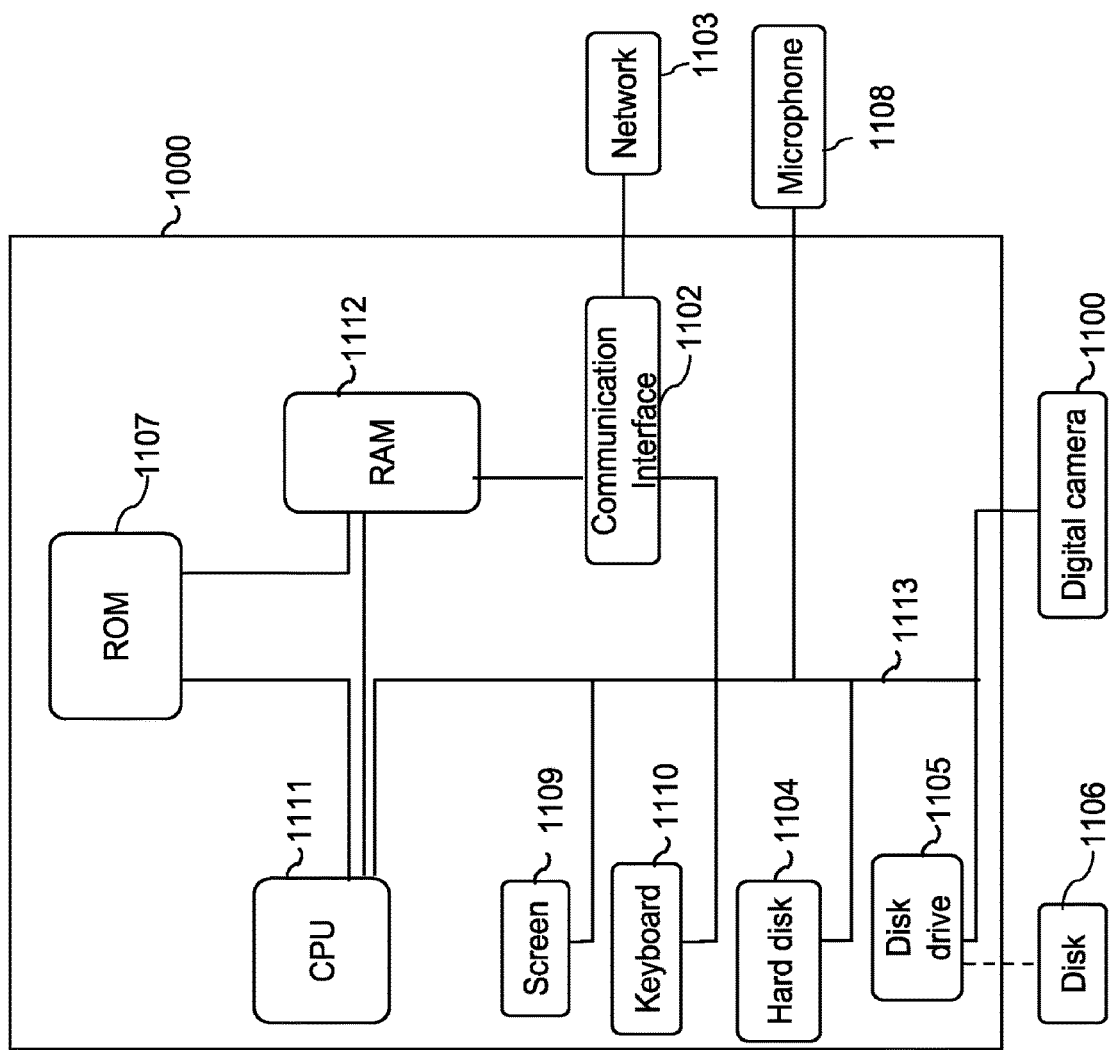
FIG. 8 shows parts of apparatus suitable for implementing an encoder according to an embodiment of the present invention.

FIG. 8 illustrates a diagram of apparatus 1000 adapted to implement an encoder according to an embodiment of the present invention or to implement a decoder. The apparatus 1000 is for example a micro-computer, a workstation or a light portable device.

The apparatus 1000 comprises a communication bus 1113 to which there are preferably connected:
    a central processing unit 1111, such as a microprocessor, denoted CPU;
    a read only memory (ROM) 1107 which stores one or more computer programs for implementing the invention;

a random access memory (RAM) 1112 which stores executable code of the method of the invention and provides registers adapted to record variables and parameters necessary for implementing the method of encoding a sequence of digital images and/or the method of decoding a bitstream, and a communication interface 1102 connected to a communication network 1103 over which digital data to be processed are transmitted.

Optionally, the apparatus 1000 may also have the following components:

a data storage means 1104 such as a hard disk, able to contain the programs implementing the invention and data used or produced during the implementation of the invention;

a disk drive 1105 for a disk 1106, the disk drive being adapted to read data from the disk 1106 or to write data onto said disk;

a screen 1109 for displaying data and/or serving as a graphical interface with the user, by means of a keyboard 1110 or any other pointing means.

The apparatus 1000 can be connected to various peripherals, such as for example a digital camera 1100 or a microphone 1108, each being connected to an input/output card (not shown) so as to supply multimedia data to the apparatus 1000.

The communication bus affords communication and interoperability between the various elements included in the apparatus 1000 or connected to it. The representation of the bus is not limiting and in particular the central processing unit is able to communicate instructions to any element of the apparatus 1000 directly or by means of another element of the apparatus 1000.

The disk 1106 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 1107, on the hard disk 1104 or on a removable digital medium such as for example a disk 1106 as described previously. According to a variant, the executable code of the programs can be received by means of the communication network 1103, via the interface 1102, in order to be stored in one of the storage means of the apparatus 1000 before being executed, such as the hard disk 1104.

The central processing unit 1111 is adapted to control and direct the execution of the instructions or portions of software code of the program or programs according to the invention, instructions that are stored in one of the aforementioned storage means. On powering up, the program or programs that are stored in a non-volatile memory, for example on the hard disk 1104 or in the read only memory 1107, are transferred into the random access memory 1112, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 9:
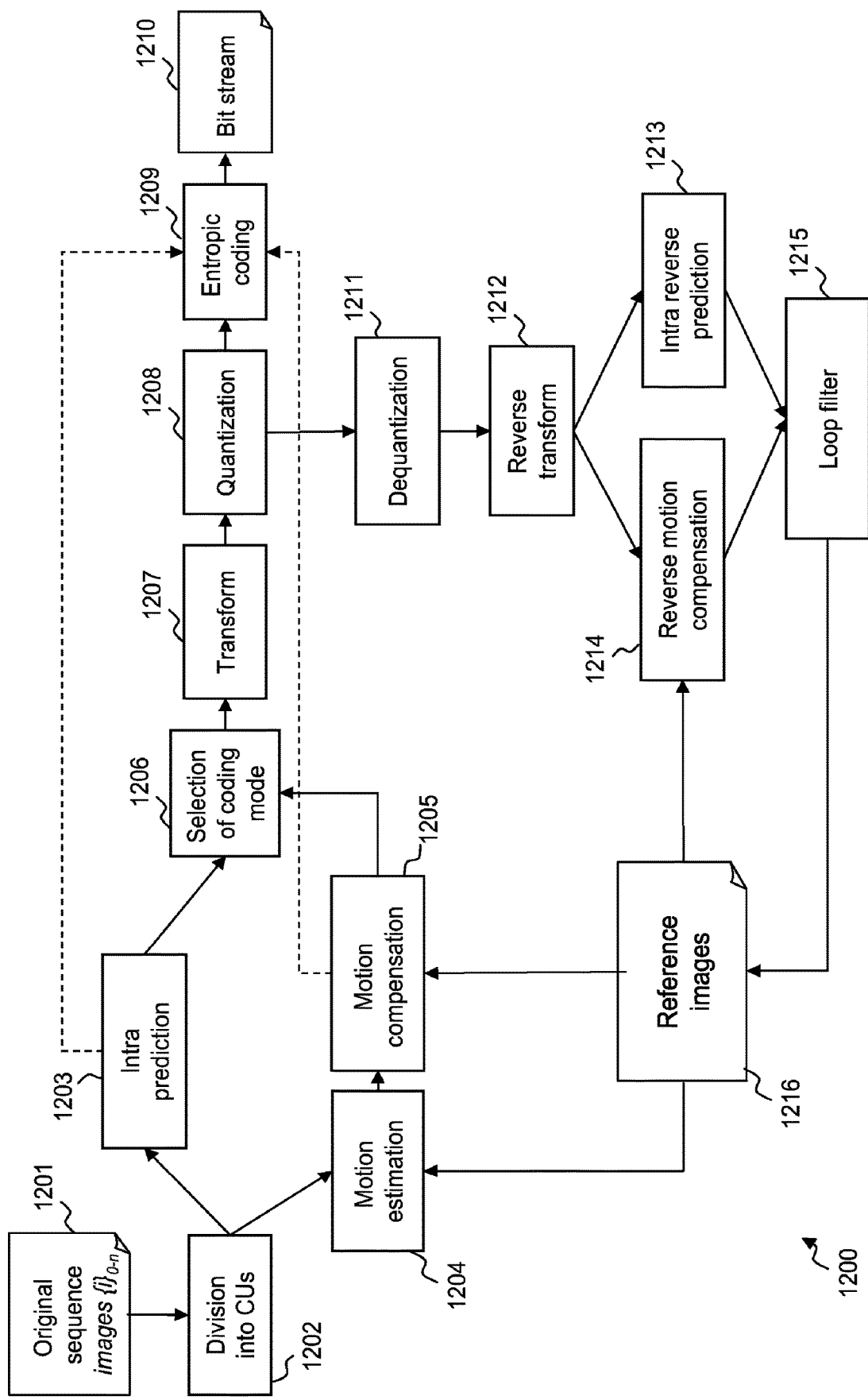
FIG. 9 shows a block diagram of parts of an encoder according to at least one embodiment of the present invention.

FIG. 9 illustrates a block diagram of an encoder 1200 according to an embodiment of the invention. The encoder is represented by connected modules, each module being adapted to implement, for example in the form of programming instructions to be executed by the CPU 1111 of apparatus 1000, a corresponding step of a method implementing an embodiment of the invention.

An original sequence of digital images $i_0$ to $i_n$ 1001 is received as an input by the encoder 1200. Each digital image is represented by a set of samples, known as pixels.

A bitstream 1210 is output by the encoder 1200.

Note that, in the following description we sometimes use the term "block" in place of the specific terminology CU and PU used in HEVC. A CU or PU is a block of pixels.

The input digital images i are divided into blocks by module 1202. These blocks are image portions and may be of variable sizes (e.g. 4×4, 8×8, 16×16, 32×32, 64×64).

During video compression, each block of an image being processed is predicted spatially by an "Intra" predictor module 1203, or temporally by an "Inter" predictor module comprising a motion estimation module 1204 and a motion compensation module 1205. Each predictor is a block of pixels issued from the same image or another image, from which a difference block (or "residual") is derived. By virtue of the identification of the predictor block and the coding of the residual, it is possible to reduce the quantity of information actually to be encoded.

The encoded frames are of two types: temporal predicted frames (either predicted from one reference frame called P-frames or predicted from two reference frames called B-frames) and non-temporal predicted frames (called Intra frames or I-frames). In I-frames, only Intra prediction is considered for coding CUs/PUs. In P-frames and B-frames, Intra and Inter prediction are considered for coding CUs/PUs.

In the "Intra" prediction module 1203, the current block is predicted by means of an "Intra" predictor, a block of pixels constructed from the information already encoded of the current image.

With regard to the "Inter" coding, two prediction types are possible. Mono-prediction (P-type) consists of predicting the block by referring to one reference block from one reference picture. Biprediction (B-type) consists of predicting the block by referring to two reference blocks from one or two reference pictures. An estimation of motion is carried out by module 1204 between the current CU or PU and reference images 1216. This motion estimation is made in order to identify, in one or several of these reference images, one (P-type) or several (B-type) blocks of pixels to use them as predictors of this current block. In a case where several block predictors are used (Btype), they are merged to generate one single prediction block. The reference images used consist of images in the video sequence that have already been coded and then reconstructed (by decoding).

Generally, the motion estimation carried out by module 1204 is a block matching algorithm (BMA).

The predictor obtained by the algorithm is then subtracted from the current data block to be processed so as to obtain a difference block (block residual). This processing is called "motion compensation" and is carried out by module 1205.

These two types of coding thus supply several texture residuals (the difference between the current block and the predictor block), which are compared in a module 1206 for selecting the best coding mode.

If "Intra" coding is selected, an item of information for describing the "Intra" predictor used is coded by an entropic encoding module 1209 before being inserted in the bit stream 1210. Embodiments of the present invention described hereinbefore with reference to FIGS. 4 to 6 are applicable to the entropic encoding module 1209 in FIG. 9.

If the module 1206 for selecting the best coding mode chooses "Inter" coding, motion information is coded by the entropic encoding module 1209 and inserted in the bit stream 1210. This motion information is in particular composed of one or several motion vectors (indicating the position of the predictor block in the reference images relative to the position of the block to be predicted) and an image index among the reference images.

The residual obtained according to the coding mode selected by the module 1206 is then transformed by module 1207. The transform applies to a Transform Unit (TU), that is included into a CU. A TU can be further split into smaller TUs 1006 using a so-called Residual QuadTree (RQT) decomposition. In HEVC, generally 2 or 3 levels of decompositions are used and authorized transform sizes are from 32×32, 16×16, 8×8 and 4×4. The transform basis is derived from a discrete cosine transform DCT.

The residual transformed coefficients are then quantized by a quantization module 1208. The coefficients of the quantized transformed residual are then coded by means of the entropic coding module 1209 and then inserted in the compressed bit stream 1210.

In order to calculate the "Intra" predictors or to make an estimation of the motion for the "Inter" predictors, the encoder performs a decoding of the blocks already encoded by means of a so-called "decoding" loop 1211-1215. This decoding loop makes it possible to reconstruct the blocks and images from the quantized transformed residuals.

The quantized transformed residual is dequantized in module 1211 by applying the reverse quantization to that provided by module 1208 and reconstructed in module 1212 by applying the reverse transform to that of the module 1207.

If the residual comes from an "Intra" coding, then in module 1213 the used "Intra" predictor is added to this residual in order to recover a reconstructed block corresponding to the original block modified by the losses resulting from a transformation with loss, here quantization operations.

If the residual on the other hand comes from an "Inter" coding, the blocks pointed to by the current motion vectors (these blocks belong to the reference images 1216 referred to by the current image indices) are merged then added to this decoded residual in module 1214. In this way the original block, modified by the losses resulting from the quantization operations, is obtained.

A final loop filter 1215 is applied to the reconstructed signal in order to reduce the effects created by heavy quantization of the residuals obtained and to improve the signal quality. The loop filter comprises two steps, a "deblocking" filter and a linear filtering. The deblocking filtering smoothes the borders between the blocks in order to visually attenuate these high frequencies created by the coding. The linear filtering further improves the signal using filter coefficients adaptively determined at the encoder. The filtering by module 1215 is thus applied to an image when all the blocks of pixels of this image have been decoded.

The filtered images, also called reconstructed images, are then stored as reference images 1216 in order to allow the subsequent "Inter" predictions taking place during the compression of the following images of the current video sequence.

In the context of HEVC, it is possible to use several reference images 1216 for the estimation and motion compensation of the current image. In other words, the motion estimation is carried out on N images. Thus the best "Inter" predictors of the current block, for the motion compensation, are selected in some of the multiple reference images. Consequently two adjoining blocks may have two predictor blocks that come from two distinct reference images. This is in particular the reason why, in the compressed bit stream, the index of the reference image (in addition to the motion vector) used for the predictor block is indicated.

The use of multiple reference images is both a tool for resisting errors and a tool for improving the compression efficacy. The VCEG group recommends limiting the number of reference images to four.

Figure 10:
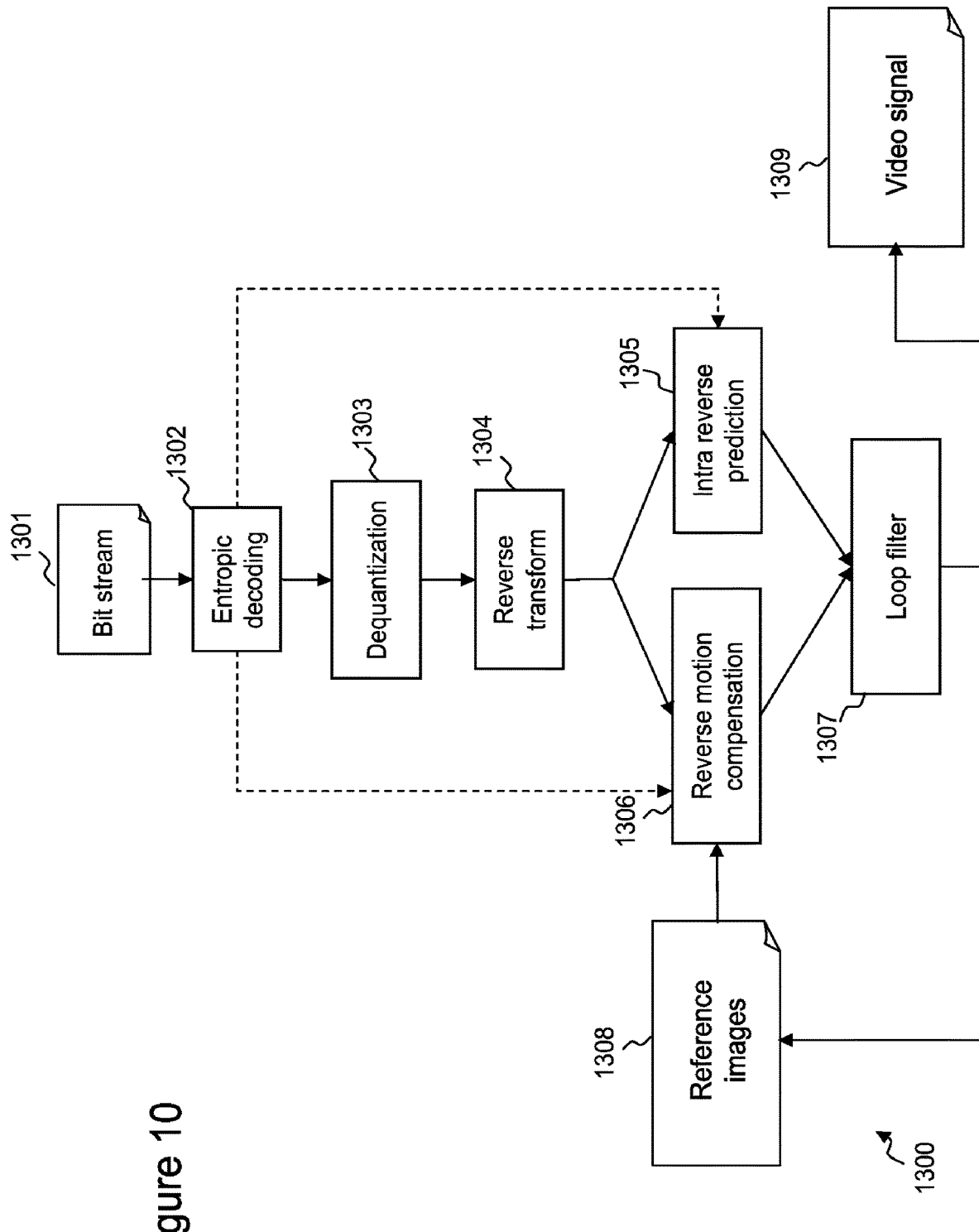
FIG. 10 illustrates a block diagram of parts of a decoder.

FIG. 10 illustrates a block diagram of a decoder 1300 according to an embodiment of the invention. The decoder is represented by connected modules, each module being adapted to implement, for example in the form of programming instructions to be executed by the CPU 1111 of apparatus 1000, a corresponding step of a method implementing an embodiment of the invention.

The decoder 1300 receives as an input a bit stream 1301 corresponding to a video sequence 1210 compressed by an encoder of the HEVC type, such as the one shown in FIG. 9.

During the decoding process, the bit stream 1301 is first of all decoded entropically by a module 1302.

The residual of the current block is then dequantized by a dequantization module 1303. This reverses the quantization carried out by the quantization module 1208 in the encoder 1200. The dequantized data is then reconstructed by a reverse transform module 1304 which performs a transformation the reverse of that carried out by the transform module 1207 in the encoder 1200.

The decoding of the data in the video sequence is then carried out image by image and, within an image, block by block.

The "Inter" or "Intra" coding mode for the current block is extracted from the bit stream 1301 and decoded entropically.

If the coding of the current block is of the "Intra" type, the number of the predictor is extracted from the bit stream and decoded entropically. The Intra predictor block associated with this index is recovered from the data already decoded of the current image.

The residual associated with the current block is recovered from the bit stream 1301 and then decoded entropically. Finally, the Intra predictor block recovered is added to the residual thus dequantized and reconstructed in a reverse Intra prediction module 1305 in order to obtain the decoded block.

If the coding mode of the current block indicates that this block is of the "Inter" type, the motion information is extracted from the bit stream 1301 by the entropic decoding module 1302 and decoded.

This motion information is used in a reverse motion compensation module 206 in order to determine the "Inter" predictor block contained in the reference images 1308 of the decoder 1300. In a similar manner to the encoder, these reference images 1308 are composed of images that precede the image currently being decoded and that are reconstructed from the bit stream (and therefore decoded previously).

The residual associated with the current block is, here also, recovered from the bit stream 1301 and then decoded entropically by module 1302. The Inter predictor block determined is then added to the thus dequantized residual reconstructed in the reverse motion compensation module 1306 in order to obtain the decoded block.

At the end of the decoding of all the blocks of the current image, the same loop filter 1307 as the filter 1215 provided at the encoder is used to eliminate the block effects and improve the signal quality in order to obtain the reference images 1308.

The images thus decoded constitute the output video signal 1309 of the decoder, which can then be displayed and used.

The embodiments described above are based on block partitions of input images, but more generally, any type of image 5 portions to encode or decode can be considered, in particular rectangular portions or more generally geometrical portions.

More generally although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encoding a mode value representing an intra prediction mode for a current unit to be encoded, the method comprising:
   deriving first, second and third reference intra prediction mode values to encode the mode value for the current unit from respective intra prediction modes of at least two neighbouring units of the current unit, wherein the number of the reference intra prediction mode values, to encode the mode value for the current unit, is three;
   encoding information for specifying the intra prediction mode for the current unit; and
   encoding the current unit using the intra prediction mode for the current unit,
   wherein deriving the first, second and third reference intra prediction mode values comprises checking whether the respective intra prediction modes of said at least two neighbouring units are the same or different and,
   if the respective intra prediction modes are different, setting the first reference intra prediction mode value to a mode value corresponding to one of said respective intra prediction modes, setting the second reference intra prediction mode value to a mode value corresponding to another of said respective intra prediction modes, and
   when one of the first and second reference intra prediction mode values corresponds to the planar prediction mode, and the other of the first and second reference intra prediction mode values corresponds to a DC prediction mode, the third reference intra prediction mode value is set to a mode value corresponding to a vertical prediction mode, and
   if the respective intra prediction modes are the same and that mode is the planar prediction mode, setting the first reference intra prediction mode value to a mode value corresponding to the planar prediction mode, setting the second reference intra prediction mode value to a mode value corresponding to the DC prediction mode and setting the third reference intra prediction mode value to a mode value corresponding to the vertical prediction mode.

2. The method according to claim 1, wherein the first, second and third reference intra prediction mode values are usable in that order for the encoding of the information for specifying the intra prediction mode for the current unit.

3. The method according to claim 1, comprising:
   comparing the mode value for the current unit with at least one of the first, second and third reference intra prediction mode values; and
   selecting, based on the comparison, a process from among at least first and second processes, to encode the information for specifying the intra prediction mode for the current unit.

4. The method according to claim 3, wherein the first process comprises encoding first information indicating a relationship between the mode value for the current unit and at least one of the first, second and third reference intra prediction mode values, and the second process comprises encoding second information representing the mode value for the current unit.

5. The method according to claim 3, wherein the first process is selected when the mode value for the current unit is equal to at least one of the first, second and third reference intra prediction mode values, and the second process is selected when the mode value for the current unit differs from each of the first, second and third reference intra prediction mode values.

6. The method according to claim 3, wherein the first process comprises encoding a flag indicating the mode value for the current unit is equal to one of the first, second and third reference intra prediction mode values.

7. A method of decoding a current unit using an intra prediction mode, the intra prediction mode being representable by a mode value for the current unit, the method comprising:
   deriving first, second and third reference intra prediction mode values from respective intra prediction modes of at least two neighbouring units of the current unit, wherein the number of the reference intra prediction mode values, to determine the mode value for the current unit, is three;
   decoding information for specifying the intra prediction mode for the current unit;
   determining the intra prediction mode for the current unit using at least the information; and
   decoding the current unit using the determined intra prediction mode for the current unit,
   wherein deriving the first, second and third reference intra prediction mode values comprises checking whether the respective intra prediction modes of said at least two neighbouring units are the same or different and,
   if the respective intra prediction modes are different, setting the first reference intra prediction mode value to a mode value corresponding to one of said respective intra prediction modes, setting the second reference intra prediction mode value to a mode value corresponding to another of said respective intra prediction modes, and
   when one of the first and second reference intra prediction mode values corresponds to the planar prediction mode, and the other of the first and second reference intra prediction mode values corresponds to a DC prediction mode, the third reference intra prediction mode value is set to a mode value corresponding to a vertical prediction mode, and if the respective intra prediction modes are the same and that mode is the planar prediction mode, setting the first reference intra prediction mode value to a mode value corresponding to the planar prediction mode, setting the second reference intra prediction mode value to a mode value corresponding to the DC prediction mode and setting the third reference intra prediction mode value to a mode value corresponding to the vertical prediction mode.

8. The method according to claim 7, wherein the first, second and third reference intra prediction mode values are usable in that order for the determining of the intra prediction mode for the current unit.

9. The method according to claim 7, comprising:
decoding a flag indicating whether the mode value for the current unit is equal to one of the reference intra prediction mode values; and
selecting, based on the decoded flag, a process from among at least first and second processes, to decode the information for specifying the intra prediction mode for the current unit.

10. The method according to claim 9, wherein the first process comprises decoding first information indicating a relationship between the mode value for the current unit and at least one of the first, second and third reference intra prediction mode values, and the second process comprises decoding second information representing the mode value for the current unit.

11. The method according to claim 9, wherein the first process is selected when the mode value for the current unit is equal to at least one of the first, second and third reference intra prediction mode values, and the second process is selected when the mode value for the current unit differs from each of the first, second and third reference intra prediction mode values.

12. The method according to claim 9, further comprising:
decoding the mode value for the current unit using the first, second or third reference intra prediction mode value when the first process is selected.

13. A device for encoding a mode value representing an intra prediction mode for a current unit to be encoded, the device comprising:
a deriving unit configured to derive first, second and third reference intra prediction mode values to encode the mode value for the current unit from respective intra prediction modes of at least two neighbouring units of the current unit, wherein the number of the reference intra prediction mode values, to encode the mode value for the current unit, is three; and
an encoding unit configured to encode information for specifying the intra prediction mode for the current unit and encode the current unit using the intra prediction mode for the current unit,
wherein the deriving unit is further configured to derive the first, second and third reference intra prediction mode values by checking whether the respective intra prediction modes of said at least two neighbouring units are the same or different and,
if the respective intra prediction modes are different, setting the first reference intra prediction mode value to a mode value corresponding to one of said respective intra prediction modes, setting the second reference intra prediction mode value to a mode value corresponding to another of said respective intra prediction modes, and when one of the first and second reference intra prediction mode values corresponds to the planar prediction mode, and the other of the first and second reference intra prediction mode values corresponds to a DC prediction mode, the third reference intra prediction mode value is set to a mode value corresponding to a vertical prediction mode, and if the respective intra prediction modes are the same and that mode is the planar prediction mode, setting the first reference intra prediction mode value to a mode value corresponding to the planar prediction mode, setting the second reference intra prediction mode value to a mode value corresponding to the DC prediction mode and setting the third reference intra prediction mode value to a mode value corresponding to the vertical prediction mode.

14. A device for decoding a current unit using an intra prediction mode, the intra prediction mode being representable by a mode value for the current unit, the device comprising:
a deriving unit configured to derive first, second and third reference intra prediction mode values from respective intra prediction modes of at least two neighbouring units of the current unit, wherein the number of the reference intra prediction mode values, to determine the mode value for the current unit, is three; and
a decoding unit configured to decode information for specifying the intra prediction mode for the current unit, determine the intra prediction mode for the current unit using at least the information, and decode the current unit using the determined intra prediction mode for the current unit,
wherein the deriving unit is further configured to derive the first, second and third reference intra prediction mode values by checking whether the respective intra prediction modes of said at least two neighbouring units are the same or different and,
if the respective intra prediction modes are different, setting the first reference intra prediction mode value to a mode value corresponding to one of said respective intra prediction modes, setting the second reference intra prediction mode value to a mode value corresponding to another of said respective intra prediction modes, and
when one of the first and second reference intra prediction mode values corresponds to the planar prediction mode, and the other of the first and second reference intra prediction mode values corresponds to a DC prediction mode, the third reference intra prediction mode value is set to a mode value corresponding to a vertical prediction mode, and
if the respective intra prediction modes are the same and that mode is the planar prediction mode, setting the first reference intra prediction mode value to a mode value corresponding to the planar prediction mode, setting the second reference intra prediction mode value to a mode value corresponding to the DC prediction mode and setting the third reference intra prediction mode value to a mode value corresponding to the vertical prediction mode.

15. A non-transitory computer readable medium which, contains executable instructions which when executed by a computer or processor, causes the computer or processor to carry out a method of encoding a mode value representing an intra prediction mode for a current unit to be encoded, the method comprising:

deriving first, second and third reference intra prediction mode values to encode the mode value for the current unit from respective intra prediction modes of at least two neighbouring units of the current unit, wherein the number of the reference intra prediction mode values, to encode the mode value for the current unit, is three;

encoding information for specifying the intra prediction mode for the current unit; and encoding the current unit using the intra prediction mode for the current unit, wherein deriving the first, second and third reference intra prediction mode values comprises checking whether the respective intra prediction modes of said at least two neighbouring units are the same or different and, if the respective intra prediction modes are different, setting the first reference intra prediction mode value to a mode value corresponding to one of said respective intra prediction modes, setting the second reference intra prediction mode value to a mode value corresponding to another of said respective intra prediction modes, and when one of the first and second reference intra prediction mode values corresponds to the planar prediction mode, and the other of the first and second reference intra prediction mode values corresponds to a DC prediction mode, the third reference intra prediction mode value is set to a mode value corresponding to a vertical prediction mode, and if the respective intra prediction modes are the same and that mode is the planar prediction mode, setting the first reference intra prediction mode value to a mode value corresponding to the planar prediction mode, setting the second reference intra prediction mode value to a mode value corresponding to the DC prediction mode and setting the third reference intra prediction mode value to a mode value corresponding to the vertical prediction mode.

16. A non-transitory computer readable medium which, contains executable instructions which when executed by a computer or processor, causes the computer or processor to carry out a method of decoding a current unit using an intra prediction mode, the intra prediction mode being representable by a mode value for the current unit, the method comprising:

deriving first, second and third reference intra prediction mode values from respective intra prediction modes of at least two neighbouring units of the current unit, wherein the number of the reference intra prediction mode values, to determine the mode value for the current unit, is three;

decoding information for specifying the intra prediction mode for the current unit;

determining the intra prediction mode for the current unit using at least the information; and decoding the current unit using the determined intra prediction mode for the current unit, wherein deriving the first, second and third reference intra prediction mode values comprises checking whether the respective intra prediction modes of said at least two neighbouring units are the same or different and, if the respective intra prediction modes are different, setting the first reference intra prediction mode value to a mode value corresponding to one of said respective intra prediction modes, setting the second reference intra prediction mode value to a mode value corresponding to another of said respective intra prediction modes, and when one of the first and second reference intra prediction mode values corresponds to the planar prediction mode, and the other of the first and second reference intra prediction mode values corresponds to a DC prediction mode, the third reference intra prediction mode value is set to a mode value corresponding to a vertical prediction mode, and if the respective intra prediction modes are the same and that mode is the planar prediction mode, setting the first reference intra prediction mode value to a mode value corresponding to the planar prediction mode, setting the second reference intra prediction mode value to a mode value corresponding to the DC prediction mode and setting the third reference intra prediction mode value to a mode value corresponding to the vertical prediction mode.

* * * * *